US012605783B2

(12) United States Patent (10) Patent No.: US 12,605,783 B2
Endo et al. (45) Date of Patent: Apr. 21, 2026

(54) METHOD FOR MANUFACTURING SOLDERED PRODUCTS

(71) Applicants: DENSO CORPORATION, Kariya-city (JP); SENJU METAL INDUSTRY CO., LTD., Tokyo (JP)

(72) Inventors: Kei Endo, Kariya-city (JP); Kazuyuki Hamamoto, Kariya-city (JP); Hisashi Tokutomi, Tokyo (JP); Motohiro Onitsuka, Tokyo (JP); Yoko Kurasawa, Tokyo (JP)

(73) Assignees: DENSO CORPORATION, Kariya-city (JP); SENJU METAL INDUSTRY CO., LTD., Tokyo (JP)

( * ) Notice: Subject to any disclaimer, the term of this patent is extended or adjusted under 35 U.S.C. 154(b) by 358 days.

(21) Appl. No.: 18/206,534

(22) Filed: Jun. 6, 2023

(65) Prior Publication Data
US 2023/0311226 A1 Oct. 5, 2023

Related U.S. Application Data

(63) Continuation of application No. PCT/JP2021/043200, filed on Nov. 25, 2021.

(30) Foreign Application Priority Data

Dec. 11, 2020 (JP) ................................. 2020-205781
Sep. 22, 2021 (JP) ................................. 2021-154163

(51) Int. Cl.
*B23K 3/02* (2006.01)
*B23K 1/00* (2006.01)
(Continued)

(52) U.S. Cl.
CPC ............ *B23K 3/025* (2013.01); *B23K 1/0008* (2013.01); *B23K 35/0227* (2013.01); *B23K 35/362* (2013.01); *B23K 2101/006* (2018.08)

(58) Field of Classification Search
CPC ................ B23K 1/0008; B23K 1/0016; B23K 2101/006; B23K 2101/42; B23K 3/025;
(Continued)

(56) References Cited

U.S. PATENT DOCUMENTS

2021/0268610 A1 9/2021 Kurasawa et al.

FOREIGN PATENT DOCUMENTS

JP 2010046687 * 3/2010
JP 5184359 B2 4/2013
(Continued)

OTHER PUBLICATIONS

A. Rabinkin, Selection Criteria for Brazing and Soldering Consumables, Welding, Brazing, and Soldering, vol. 6, ASM Handbook, Edited By David LeRoy Olson, Thomas A. Siewert, Stephen Liu, Glen R. Edwards, ASM International, 1993, p. 903-905, https://doi.org/10.31399/asm.hb.v06.a0001450 (Year: 1993).*

*Primary Examiner* — Nicholas A Wang
(74) *Attorney, Agent, or Firm* — Harness, Dickey & Pierce, P.L.C.

(57) ABSTRACT
A method for manufacturing a soldered product by soldering a solder object portion, including: a solder supplying step that causes a cylindrical soldering iron having a through hole to contact with the solder object portion to supply a thread solder piece to the solder object portion from the through hole; a heating step that heats the thread solder piece with the cylindrical soldering iron and causes to melt the thread solder piece at the solder object portion; and a curing step that cures a melting object of the thread solder piece to solder the solder object portion. The thread solder piece is composed of a core containing a flux and a coating member containing a solder alloy that covers the core. The flux has a rosin having an acid value which is substantially as a main component thereof.

6 Claims, 6 Drawing Sheets

(51) Int. Cl.
B23K 35/02 (2006.01)
B23K 35/362 (2006.01)
B23K 101/00 (2006.01)

(58) Field of Classification Search
CPC .... B23K 3/03; B23K 3/0623; B23K 35/0205;
B23K 35/0227; B23K 35/3601; B23K
35/362
See application file for complete search history.

(56)   References Cited

FOREIGN PATENT DOCUMENTS

| | | | |
|---|---|---|---|
| JP | 2013193097 | * | 9/2013 |
| JP | 2018061978 | * | 4/2018 |
| JP | 6516053 B1 | | 5/2019 |
| JP | 2019130566 | * | 8/2019 |

* cited by examiner

| NO RED EYE | RED EYE AT 1 POINT | PLURALITY OF RED EYES, NO WET IN OUTER PERIPHERY: LESS THAN 50% | NOT WETTED IN OUTER PERIPHERY: FROM 50% TO LESS THAN 100% | NOT WETTED IN OUTER PERIPHERY: 100% | MIS-SOLDERING |
|---|---|---|---|---|---|
| 5 POINTS | 4 POINTS | 3 POINTS | 2 POINTS | 1 POINT | 0 POINT |

CONTENT RATE OF ROSIN HAVING 0 ACID VALUE IN FLUX [wt%]

AMOUNT OF HEATING LOSS@400°C [%]

METHOD FOR MANUFACTURING SOLDERED PRODUCTS

CROSS-REFERENCE OF RELATED APPLICATIONS

This application is the U.S. bypass application of International Application No. PCT/JP2021/043200 filed on Nov. 25, 2021, which designated the U.S. and claims priority to Japanese Patent Application Nos. 2020-205781 filed on Dec. 11, 2020, and 2021-154163 filed on Sep. 22, 2021 the contents of both of these are incorporated herein by reference.

BACKGROUND

Technical Field

The present disclosure relates to a method for manufacturing soldered products with a so-called sleeve-type soldering.

Background of the Related Art

A soldered product such as an electronic product is produced by soldering between terminals of electronic components and between an electronic component and a substrate. With the soldering, soldered products such as sensors, actuators, inverters, power window devices and motor devices are produced. For soldering between the electronic components and the substrate, surface mount soldering such as a reflow method and jet flow soldering are utilized. The soldering for bonding completed electronic circuit completed by these soldering, and components such as connectors, actuators and sensors are referred to as an add-on soldering. For the add-on soldering, iron soldering, laser soldering and sleeve soldering are utilized.

SUMMARY

A first aspect of the present disclosure is a method for manufacturing a soldered product by a solder object portion. The method includes a solder supplying step that causes a cylindrical soldering iron having a through hole to contact with the solder object portion to supply a thread solder piece to the solder object portion from the through hole; a heating step that heats the thread solder piece with the cylindrical soldering iron and causes to melt the thread solder piece at the solder object portion; and a curing step that cures a melting object of the thread solder piece to solder the solder object portion.

BRIEF DESCRIPTION OF THE DRAWINGS

The above-described objects and other objects, features and advantages of the present disclosure will be clarified further by the following detailed description with reference to the accompanying drawings.

The drawings are.

DETAILED DESCRIPTION OF THE PREFERRED EMBODIMENTS

A soldered product such as an electronic product is produced by soldering between terminals of electronic components and between an electronic component and a substrate. With the soldering, soldered products such as sensors, actuators, inverters, power window devices and motor devices are produced. For soldering between the electronic components and the substrate, surface mount soldering such as a reflow method and jet flow soldering are utilized. The soldering for bonding completed electronic circuit completed by these soldering, and components such as connectors, actuators and sensors are referred to as an add-on soldering. For the add-on soldering, iron soldering, laser soldering and sleeve soldering are utilized.

According to the sleeve soldering method, for example, according to a technique disclosed by Japanese Patent No. 5184359, scattering of solder in soldering and scattering of flux are suppressed and there is an advantage in stable supply of a constant amount of solder to an object portion of the bonding.

For sleeve soldering, generally, a cylindrical soldering iron and a thread solder are used. The thread solder contains a solder alloy and a flux. As the flux, a resin such as a rosin (i.e. resin flux) is used. Such a solder is also referred to as resin flux cored solder.

In the technical field of soldering, in order to obtain the above-described advantages, a solder and a flux capable of being applied to the sleeve type soldering have been developed. For example, according to Japanese Patent No. 6516053, a technique using a flux containing volatile rosin as a main component. With the technique disclosed by PTL2, a defective soldering due to the flux can be suppressed. Specifically, according to Japanese Patent No. 6516053, the defective soldering can be suppressed while reducing frequency of cleaning. operations.

For example, according to a flux disclosed by Japanese Patent No. 6516053, since the flux is likely to be volatile, stain can be prevented from accumulating inside the soldering iron. However, a part of the flux remains inside the soldering iron and flux residue is accumulated as a carbide stain inside the soldering iron.

Hereinafter, with reference to the drawings, embodiments of the present disclosure will be described.

First Embodiment

Figure 1:
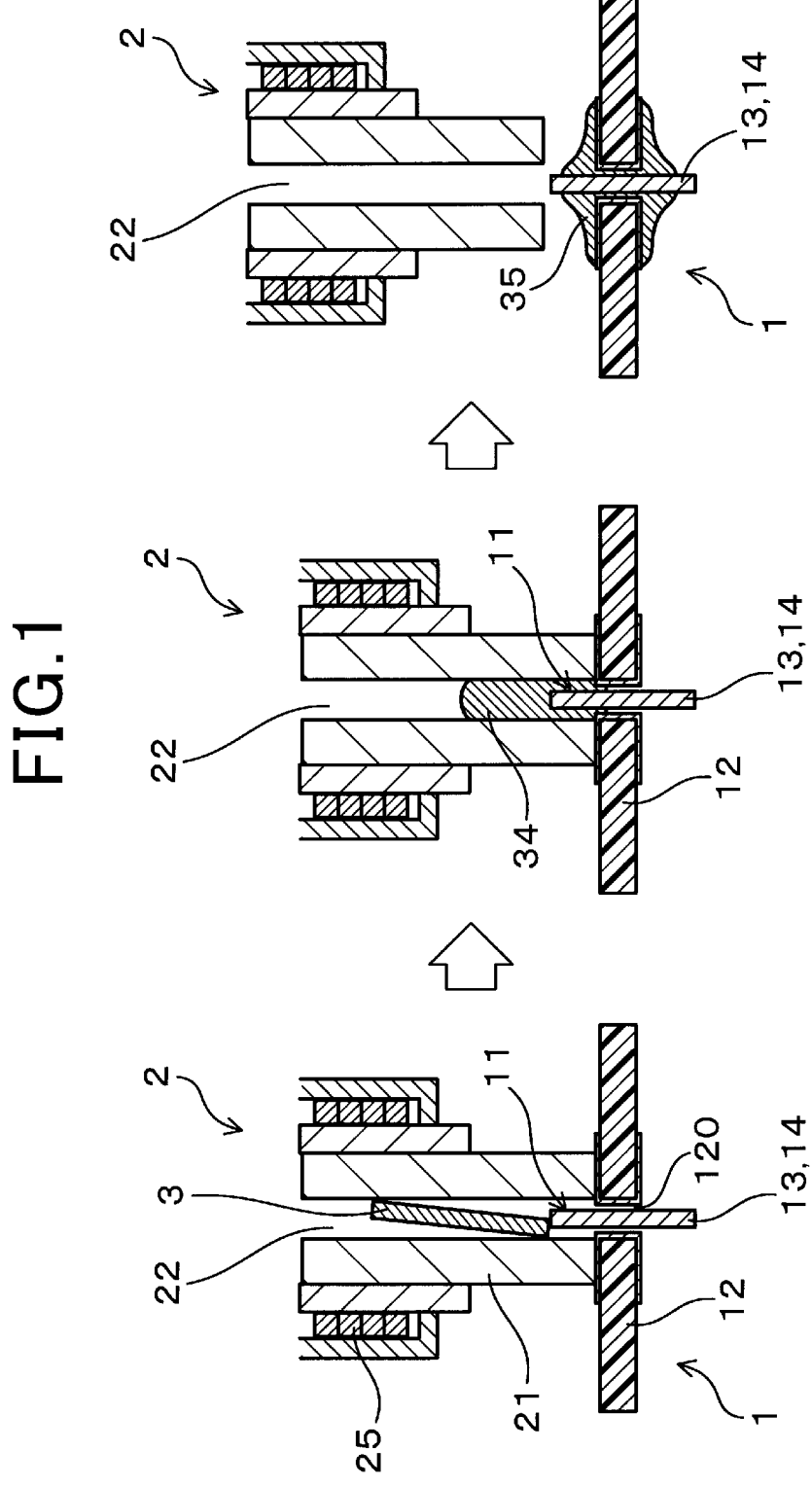
FIG. 1 is a schematic diagram showing a sleeve-type soldering method according to a first embodiment.
Figure 2:
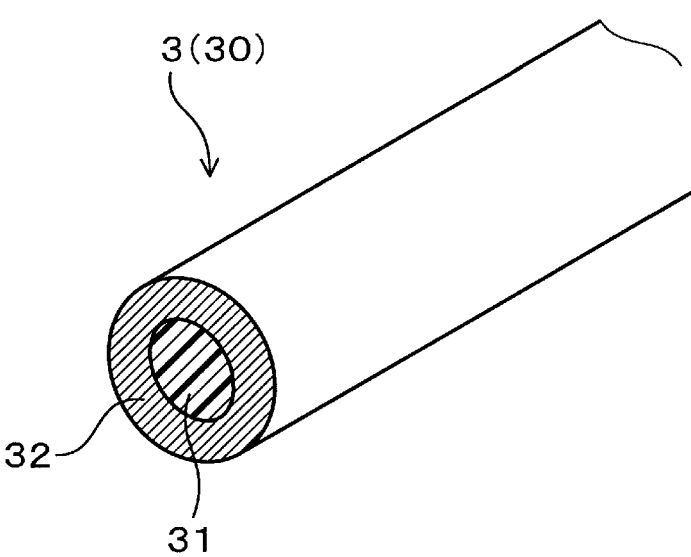
FIG. 2 is a schematic diagram showing a cross-section of a thread solder according to a first embodiment.
Figure 3:
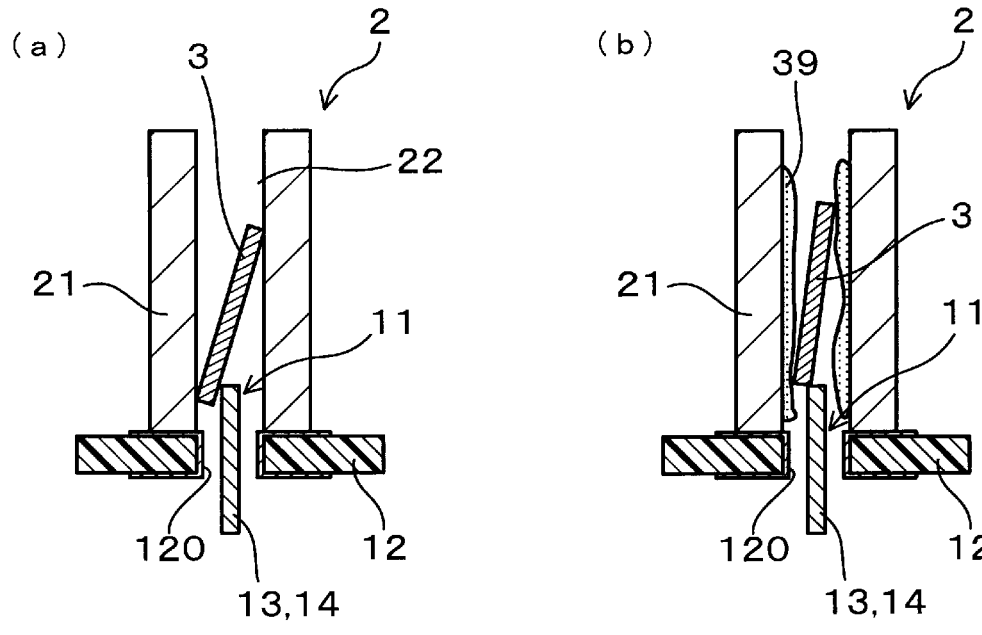
FIG. 3 is a schematic diagram in which (a) part shows a schematic view of a solder object portion in a state where no stain is present in a cylindrical soldering iron and (b) part shows a schematic view of a solder object portion in a state where a stain is accumulated in a cylindrical soldering iron.

With reference to FIGS. 1 to 3, embodiments of a manufacturing method of a soldered product will be described. In the specification, an expression '-' (range) includes numeric values or physical values described before and after the expression '-'. Also, in the specification, wt % and mass % are substantially the same.

A soldered product 1 refers to a product having a soldering part. As shown in a) left, b) middle and c) right portions in FIG. 1, the soldered product 1 includes a printed circuit board 12 and an electronic component 13 soldered to the printed circuit board 12. The printed circuit board 12 may include a through hole 120. More specifically, a solder object portion 11 is composed of a through hole 120 of the printed circuit board 12 and a terminal 14 (e.g. metal pin). The soldered product 1 includes a product in which such a solder object portion 11 is soldered. Although illustration is omitted, the printed circuit board 12 may be a so-called multi-layered substrate. As long as the soldering part is included, the soldered product 1 is not limited a specific product.

According to the above-described manufacturing method, a solder supplying step, a heating step and a curing step are performed. In the soldering process having these steps, a thread solder is heated with a soldering iron to reach a temperature exceeding a melting point of the solder (i.e. solder alloy), thereby melting the thread solder while heating a bonding object. In this soldering process, the thread solder is supplied into the through of the soldering iron, maintaining the temperature exceeding the melting point of the solder so as to heat the thread solder supplied in the through hole. This soldering process is referred to as so-called sleeve type soldering. As shown in FIG. 1 indicating (a) to (c) part of figures, sleeve-type soldering is performed with a sleeve-type soldering equipment 2 (i.e. soldering iron 2), for example.

In the solder supplying process, as shown in (a) part in FIG. 1, a tip end of the soldering equipment 2 is caused to contact with the solder object portion 11. The soldering equipment 2 includes a cylindrical-shaped main body 21 in which a through hole is formed. As shown in (a) part in FIG. 1, for example, the main body 21 comes into contact with the solder object portion 11. The main body 21 comes into contact with the solder object portion 11 such that at least part of or all of the solder object portion 11 is disposed inside the through hole 22. The cylindrical-shaped main body 21 is made of a material containing ceramics having an excellent thermal conductivity. More specifically, the cylindrical-shaped main body 21 is made of an aluminum nitride, a silicon carbide and the like.

In the solder supplying process, as shown in (a) part in FIG. 1, a thread solder piece 3 is supplied to the solder object portion 11 from the through hole 22 of the main body 21. The thread solder piece 3 is caused to move with the self-weight itself in the through hole 22, whereby the thread solder piece 3 can be supplied to the solder object portion 11. As shown in FIG. 2, the shape of the thread solder 30 is, for example, a rod shape or a cylindrical shape. The thread solder is composed of a core 31 and a coating member 32. The same applies to the thread solder piece 3. The core 31 is composed of a flux. The coating member 32 is made of solder alloy and coats the core 31. The thread solder 30 is cut to be a suitable size (i.e. length) for soldering the solder object portion 11, thereby forming the thread solder piece 3. This thread solder piece 3 is supplied to the solder object portion 11.

The composition of the solder alloy is not limited to any specific composition as long as the composition is suitable for soldering. For the solder alloy, a soft solder is utilized, for example. The melting point of the solder alloy is usually 180° C. to 280° C.

The flux contains at least rosin. The flux may further contain an activator. The details of the activator will be described later.

The flux at least contains rosin having substantially 0 acid value (e.g. rosin ester) as a main component thereof. In the present specification, 'substantially 0' includes a case where rosin has a slight acid value due to a reactive residue (i.e. carboxyl group) when a carboxylic acid contained in the rosin is esterified. Specifically, rosin having substantially 0 acid value refers to a rosin having an acid value less than 10 KOHmg/g. The rosin having substantially 0 acid value is referred to as 'acid free rosin' in the specification. In the case where the acid free rosin is not the main component, flux residue is likely to be accumulated in the cylindrical soldering iron main body 21. In other words, there is a concern that stain inside the soldering iron main body 21 cannot be sufficiently suppressed. As shown in (b) part in FIG. 3, in the case where stain 39 is accumulated in the soldering iron main body 21, even when the thread solder piece 3 is melted in the heating step, the flux or the solder alloy may not be sufficiently supplied to the solder object portion 11. Also, a thermal conductivity of a cylindrical soldering iron (i.e. main body 21) decreases such that the flux or the solder alloy may not be supplied to the solder object portion 11. Further, a stain removing operation may be frequently performed in order to avoid the above-described defects and may cause an increase in a manufacturing cost of the soldered product 1. Note that the main component refers to a component having the largest amount in the components constituting the flux, and may preferably have an amount of larger than or equal to 50 mass %. Also, as shown in (a) part in FIG. 3, in a state where stain is not accumulated, the thread solder piece 3 is not prevented from supplying to the solder object portion 11 and a thermal conduction from the heater 25 is not disturbed.

The measurement object of the acid valuer according to the present specification is, substrate resin (i.e. rosin), flux. The measurement of the acid value is performed conforming to JIS Z 3197:2012 8.1.4.1.1. The detailed measurement condition will be described later.

In the present specification, with the above-described measurement method, in the case where the acid value is less than 10 KOHmg/g (including 0), the acid value is substantially 0. In the case where the acid value is larger than or equal to 10 KOHmg/g, the acid value is expressed with the actual measurement value.

The acid value of the flux may preferably be 20-60 KOHmg/g. The acid value of the flux refers to the acid value of whole flux and this acid value is referred to as total acid value. When the total acid value is larger than or equal to 20 KOHmg/g, the wettability is improved. Further, when the total acid value is less than or equal to 60 KOHmg/g, stain is unlikely to be accumulated. In a view point of improving the wettability and preventing flux stain from being accumulated in the cylindrical soldering iron, the total acid value may preferably be 23 to 57 KOHmg/g, and may more preferably be 25 to 54 KOHmg/g.

The total acid value of the flux can be adjusted in the following manner, for example. For example, rosin having the acid value exceeding substantially 0 (i.e. rosin other than acid free rosin) is added to the flux, and the blending ratio of the rosin is adjusted, whereby the total acid value of the flux can be adjusted. Specifically, adding a rosin having high acid value and increasing the blending ratio thereof, the total acid value is likely to be higher. On the other hand, increasing the blending ratio of the acid free rosin, the total acid value is likely to be lower. As a rosing having the acid value exceeding substantially 0, a hydrogenated rosin, a acid modified rosin, a disproportionated rosin, a modified phenol rosin and the like may be utilized.

Also, components other than rosin such as activator can be added to the flux. As the activator, an organic acid, a halogen-based activator, an amine and the like are exemplified. These activators are selected from one generally used for a flux of a thread solder and used, for example. In the case where the organic acid is used for the activator, the blending ratio thereof is appropriately adjusted, whereby total acid value of the flux can be adjusted.

For the organic acid, glutaric acid, adipic acid, azelaic acid, eicosanoic-diacid, citric acid, glycolic acid, succinic acid, salicylate acid, diglycollic acid, dipicolinic acid, dibutylaniline glycolic acid, suberic acid, sebacic acid, thioglycolic acid, phthalic acid, isophthalic acid, terephthalic acid, dodecanedioic acid, para-hydroxyphenyl acetic acid, picolinic acid, phenyl succinic acid, fumaric acid, maleic acid, malonic acid, lauric acid, benzoic acid, tartaric acid, tris-(2-oxopropyl)isocyanurate, glycine, 1,3-cyclohexanedicarboxylic acid, 2,2'-bis(hydroxymethyl)butanoic acid, 4-tert-butylbenzoate, 2,3-dihydroxybenzoic acid, 2,4-diethyl glutaric acid, 2-quinolinecarboxylic acid, 3-hydroxybenzonic acid, malic acid, p-anisic acid, palmitic acid, stearic acid, 12-hydroxystearic acid, oleic acid, linoleic acid, linolenic acid and the like may be utilized.

As a halogen-based activator, an organic bromo compound can be used. Specifically, trans-2,3-dibromo-1,4-butynediol, triallyl isocyanurate 6 bromide, 1-bromo-2-butanol, 1-bromo-2-propanol, 3-bromo-1-propanol, 3-bromo-1,2-propanediol, 1,4-dibromo-2-butanol, 1,3-dibromo-2-propanediol, 2,3-dibromo-1-propanol, 2,3-dibromo-1,4-butynediol, 2,3-dibromo-2-butyne-1,4-diol, trans-2,3-dibromo-2-butyne-1,4-diol, cis-2,3-dibromo-2-butyne-1,4-diol, tetrabromophthalic acid, bromo succinic acid, 2,2,2-tribromoethanol and the like may be used. Further, as the halogen-based activator, an organic chloro compound can be used.

Specifically, a chloroalkane, chlorinated fatty acid ester, het acid, or chlorendic acid anhydride can be used. Moreover, as the halogen-based activator, a fluorine-based surfactant as an organic fluoro compound, a surfactant containing a perfluoroalkyl group, and the like can be used.

As an amine, mono ethanolamine, diphenyl guanidine, ethylamine, triethylamine, ethylenediamine, tri ethylene tetramine, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-methylimidazole, 1-cyanoethyl-2-methylimidazole, 1-cyanoethyl-2-undecylimidazole, 1-cyanoehtyl-2-ethyl-4-methylimidazole, 1-cyanoethyl-2-phenylimidazole, 1-cianoethyl-2-undecylimidazoliumtrimellitate, 1-cyanoethyl-2-phenylimidazoliumtrimellitate, 2,4-diamino-6-[2'-methylimidazolyl-(1')]-ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine-isocyanuric acid adduct, 2-phenylimidazoleisocyanuric acid adduct, 2-phenyl-4,5-dihydroxy methyl imidazole, 2-phenyl-4-methyl-5-hydroxymethylimidazole, 2-3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine-isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazole-2-yl)-4-tert-octylphnol], 6-(2-benzotriazolyl)-4-tert-octyl-6'-tert-butyl-4'-methyl-2,2'-methylene bisphenol, 1,2,3-benzotriazole, 1-[N,N-bis(2-ethylhexyl) aminoethyl]benzotriazole, carboxy benzotriazole, 1-[N,N-bis(2-ethylhexyl)aminoethyl]methyl benzotriazole, 2,2'-[[(methyl-1H-benzotriazole-1yl)methyl]imino]bis-ethanol, 1-(1',2'-dicarboxyethyl)benzotriazole, 1-(2,3-dicarboxypropyl)benzotriazole, 1-[(2-ethylhexylamino)methyl]benzotriazole, 2,6-bis[(1H-benzotriazole-1-yl)methyl]-4-methylphenol, rosin amine, N,N-diethyl aniline and the like can be used.

The content rate of the activator in the flux may preferably be less than or equal to 10 mass %. In this case, insulation reliability is improved. In order to further improve the insulation reliability, the content rate of the activator in the flux may preferably be less than or equal to 4 mass % and more preferably be less than or equal to 3.5%. Note that the flux according to the present disclosure, even if the content rate of the activator in the flux is reduced as described above, sufficient wettability is secured. Moreover, in order to secure wettability, the flux may preferably contain the activator. The content rate thereof may preferably be larger than or equal to 1 mass % and more preferably be larger than or equal to 1.5 mass %.

The flux may further contain a halogen-based activator containing halide. The content rate of the halogen in the flux may preferably be less than or equal to 4 mass %. In this case, an insulation resistance under a high-humidity environment can be prevented from being degraded. In order to improve the above effects, the content rate of the halogen in the flux may preferably be less than or equal to 3.5 mass % and more preferably be less than or equal to 3 mass %.

The flux may preferably contain a rosin of which the acid value is larger than or equal to 150 KOHmg/g. In this case, total acid value can readily be adjusted. Hence, the total acid value can be larger than or equal to 20 KOHmg/g with a fewer amount of addition compared to an acid free rosin. Thus, an effect of improving the wettability and an effect of suppressing accumulation of stain can be both achieved. Similarly, the flux may more preferably contain rosin of which the acid value is larger than or equal to 200 KOHg/g.

The content rate of the acid free rosin in the flux may preferably be larger than or equal to 60 mass %. In this case, effect of suppressing the flux from accumulating in the cylindrical soldering iron main body 21 can be further improved. In order to further improve this effect, the content rate of the acid free rosin in the flux may preferably be larger than or equal to 70 mass % and more preferably be larger than or equal to 75 mass %.

Generally, according to the sleeve-type soldering, for shortening a soldering time and improving the productivity, the soldering is performed, in order to promptly transfer heat from the cylindrical soldering iron which is heated by a heater to the thread solder piece supplied in the cylindrical solder iron and the solder object portion, such that the temperature of the soldering iron is heated at a temperature (e.g. 400° C.) significantly higher than a melting temperature (i.e. melting point of solder alloy) of the soldering. An amount of heating loss of the flux at 400° C. which is a heating temperature of the soldering may preferably be smaller than or equal to 55 mass %. That is, a mass reduction ratio of the flux when heating the flux at a temperature 400° C. may preferably be smaller than or equal to 55 mass %. In this case, the flux barely volatizes in the heated solder iron and is discharged in a liquid state to a soldering part. Hence, an outer periphery of the solder iron body and other portions of the soldering equipment can be prevented from being contaminated by flux fumes as a volatile component of the flux adhered thereto. The detailed measurement method of an amount of heating loss will be described in an experimental example.

The accumulation of stain is considered to occur in the following manner. Since rosin contains carboxyl group, the rosin has tackifier characteristics (i.e. viscosity, adhesiveness) due to the carboxyl group. Hence, the rosin is likely to be accumulated as a flux residue (i.e. stain). On the other hand, residue accumulated on the inner wall is removed by, for example, a periodical cleaning process. Since the residue is strongly adhered and accumulated on the inner wall, a carbide drill is used for cleaning to physically remove the residue. Therefore, fine unevenness is likely to be formed on the inner wall surface of the cylindrical soldering iron 2. The unevenness on the inner wall surface enhances a so-called anchor effect, whereby the residue is more likely to be accumulated.

When developing the technique of the present disclosure, the inventors of the present disclosure have found a correlation between an acid value of the rosin and an accumulation of the stain. According to the present disclosure, acid free rosin is utilized as a main component having less tackifier characteristics because since almost no carboxyl group is contained. Therefore, it is possible to reduce an amount of rosin such as acrylic rosin of which the acid value exceeds 0, whereby the stain can be reduced.

As shown in (a) to (c) parts in FIG. 1, the soldering iron 2 includes a heater 25, for example. The heater 25 is configured to heat a portion inside the through hole 22. However, the heating method and configuration thereof are not specifically limited.

Next, in the heating step, the thread solder piece 3 is heated by the soldering iron 2. With the heating step, the thread solder piece 3 is melted. Specifically, the flux is caused to be softened or melted, thereby melting the solder alloy. The heating step is performed by the heater 25.

The heating temperature at the heating step is, for example, higher than or equal to the melting point of the solder alloy, which is a temperature that allows the solder alloy to be promptly melted. The heating temperature may preferably be higher than or equal to 400° C. Further, the heating temperature may preferably be lower than or equal to 550° C., for example in order to avoid thermal damage and burning in the vicinity of the solder object portion 11 such as of a substrate.

In the curing step, a melting object 34 of the thread solder piece 3 is caused to be cured. The curing is performed by a cooling such as an air cooling. Thus, the solder object portion 11 is soldered and the soldered product 1 having a soldering part 35 (solder filet 35) can be manufactured.

As described, according to the present embodiment, the soldered product 1 can be manufactured. In the manufacturing, a flux of which the main component is an acid free rosin is used, whereby a stain caused by a flux residue can be prevented from accumulating in the cylindrical soldering iron 2. In the case where the flux residue is accumulated in the cylindrical soldering iron 2, heat transfer inhibition occurs on the thread solder piece supplied inside the soldering iron in the high temperature state when soldering. However, according to the manufacturing method of the present disclosure, since the flux residue is prevented from being accumulated as described above, the heat transfer inhibition is suppressed. Hence, a frequency of cleaning process for inside the soldering iron 2 can be significantly reduced, and the soldered product 1 having a stable quality can be continuously produced without stopping the production line of the soldered product 1 for the cleaning. The cleaning process is periodically performed with either one method or both methods in the following two methods. A first method is to physically remove a stain with a carbide drill inserting into the cylinder after stopping the soldering when an amount of stain reaches a predetermined amount, and a second method in which the sleeve is heated at a temperature larger than or equal to 600° C. to carbonize organic matter (i.e. flux residue), thereby reducing the amount of stain.

The soldered product 1 may preferably be used for a vehicle. As the soldered product 1 for vehicle, for example, a sensor, an actuator, an inverter, a power window, a motor and the like are exemplified.

Note that reference numbers in later description which are the same as the reference numbers used in the existing embodiments indicate similar components in the existing embodiments.

Experiment Example

According to the present example, thread solders containing each flux shown in the table 1 (example 1 to 5, comparative example 1) were utilized to produce the solder product 1 and various measurements and evaluations were exemplified. For the solder product 1, as described in the first embodiment, a solder supplying step, a heating step and a curing step were performed.

In the table 1, respective solder alloys have the same composition through all examples and comparative example, where Sn-3.0 mass % Ag-0.5 mass % Cu. Further, respective measurements and evaluations based on the conditions shown in FIG. 1 were performed in the following manner.

Content Rate of Acid Free Rosin in the Flux

A gas chromatography quantitative analysis method (GC-FID) was utilized. For the measurement, a gas chromatograph apparatus Agilent 7890A manufactured by Agilent Technologies is utilized and the measurement was performed in accordance with JIS K 0123:2018. The GC condition is, a sample injection amount: 2 μL, an injection temperature 260° C. and carrier gas He (linear velocity 25 cm/sec). For the FID condition, an acquiring speed 5 Hz, a detector temperature 300° C., an air flow rate 400 mL/min, H2 flow rate 30 mL/min, a makeup flow rate 25 mL/min.

Acid Value of Flux (Total Acid Value)

An acid value test was conducted. The measurement was performed using a potentiometric titrator AT-710 manufactured by KYOTO ELECTRONICS MANUFACTURING CO., LTD in accordance with JIS Z 3197:2012 8.1.4.1.1. In the measurement, a composite glass electrode is used and 0.5N-potassium hydroxide was used for titrant.

Heating Loss Amount of Flux at 400° C.

Figure 5:
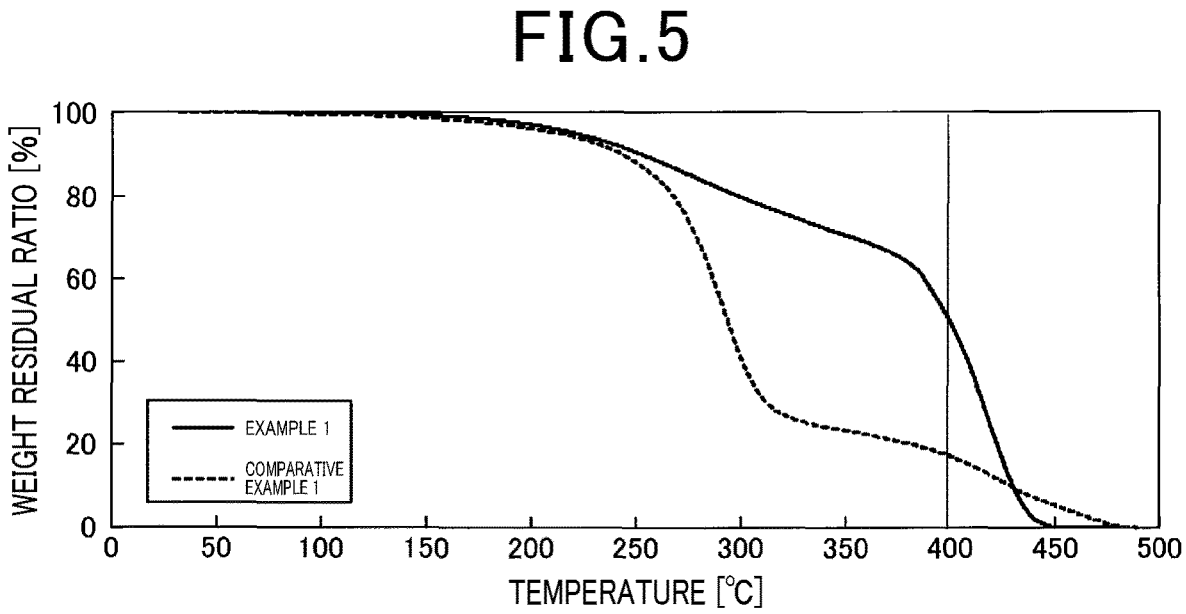
FIG. 5 is a graph showing a result of thermogravimetry of an example 1 and a comparative example 1 according to the experiment example.

A TG method (thermogravimetry) was used to measure the amount of heating loss. The measurement was performed in accordance with JIS K 7120:1987. Note that the mass-reduction ratio of the flux at 400° C. is the heating loss amount. The measurement result for the example 1 and the comparative example 1 are shown in FIG. 5. In FIG. 5, the vertical axis indicates a weight residual ratio R (unit: %). The heating loss amount D (unit: %) is calculated using the following equation (1). For the sleeve-type soldering, generally, the temperature at the heating process is set to be higher than or equal to 400° C. Hence, the heating loss amount of the flux was measured at 400° C. which is the lowest temperature thereof.

$$D=100-R \qquad (1)$$

Halogen Content Rate

A combustion ion chromatography was used to measure the halogen content rate. For the measurement, a furnace ARF-2100H manufactured by Nittoseiko Analytech Co., Ltd and an ion chromatograph apparatus ICS-11-manufactured by Thermo Fisher Scientific K.K were used to measure the halogen content rate in accordance with BS EN 14582:2016. The condition of the furnace is: inlet temperature 900° C., outlet temperature 1000° C., air flow rate 200 mL/min, $O_2$ flow rate 400 mL/min, WSAr flow rate 100 mL/min, and the IC condition is: flow rate 1.2 mL/min, sample injection quantity 25 to 100 μL and measurement time 23 min.

Stain Evaluation

As shown in (a) to (c) parts in FIG. 1, soldering was continuously performed to a printed circuit board 12 having a through hole 120. As the sleeve-type soldering equipment 2, J-CAT 300 SLV manufactured by Apollo Seiko is used. A soldering failure occurs in the case where stain is accumulated on an inner wall of a sleeve (i.e. cylindrical main body 21) (see (b) in FIG. 3), causing a clogging at a tip end of the soldering iron due to the stain. As a result, a favorable solder filet cannot be formed. A clogging life is defined in the following manner. A pin gauge is dropped into the sleeve and a change in the inner diameter caused by a stain accumulation is confirmed. When the initial diameter 1.3 mm is changed by 0.5 mm, it is defined as the clogging life. Also, a clogging shot is defined as the number of continuously performed soldering shots until the clogging life. When the clogging shot is larger than 15000, it is determined as pass (i.e. level A) and the clogging shot is less than 15000, it is determined as fail (i.e. level B). The larger the clogging shot, the less likely to accumulate stain. When the clogging shot is larger than 15000, and assuming that a time required for a single soldering process (specifically, time including a moving time for the sleeve-type soldering apparatus to solder object point) is 2 seconds, for example, it is limited to 30000 seconds (i.e. 8.3 hours). Hence, for example, when performing the soldering 2 times a day, since an operation hour for one soldering operation is 8 hours, no interruption to the cleaning operation is required within one soldering operation. Note that the determination criteria according to the present evaluation method is strict. Hence, even if 12000 clogging shots or larger is still sufficiently high, a sufficient effect of suppressing the stain accumulation is obtained. Specifically, the number of clogging shots may preferably be larger than 12000, more preferably be larger than 13000 and furthermore preferably be larger than 15000.

Wettability

Figure 4:
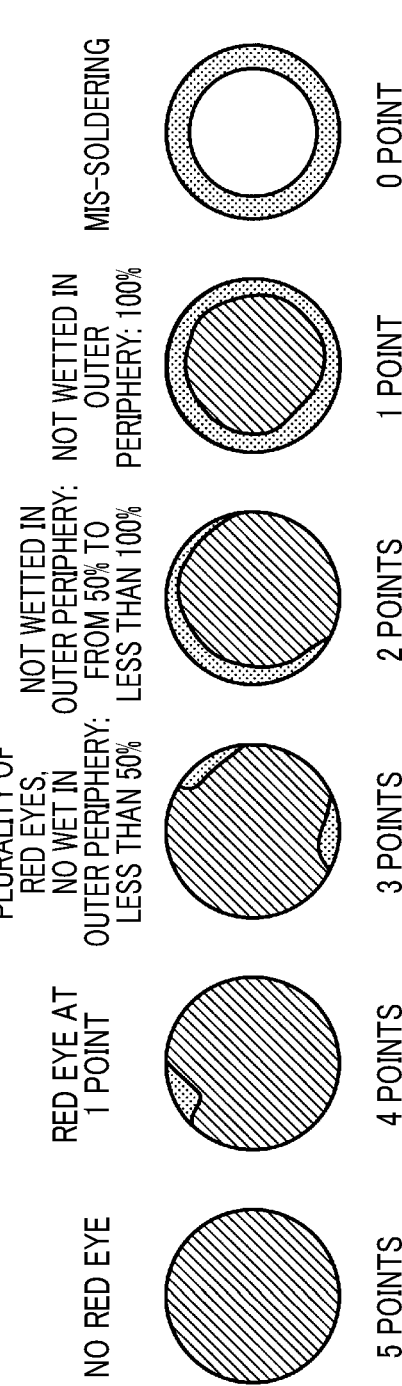
FIG. 4 is an explanatory diagram showing a determination criteria of a solder wettability according to an experiment example.

Similar to the stain evaluation, the soldering equipment 2 was used to perform a soldering to the printed circuit board 12 having the through hole 120. Then, a wettability is evaluated on front/back side of the land using a solder red-eye ratio. The red eye refers to a phenomenon in which a copper foil exposure remains on a part of the land since the solder cannot spread on the entire land when soldering. The evaluation was performed with the index shown in FIG. 4. The evaluation for the solder red-eye ratio based on the index shown in FIG. 4 was performed at 80 points. In the evaluation, comparing with an ECO-SOLDER RMA02 manufactured by Senju Metal Industry Co., Ltd, when the evaluation result was better than that of the ECO-SOLDER RMA02, the evaluation result is determined as A (excellent), when the evaluation result was similar to that of the ECO-SOLDER RMA02, the evaluation result is determined as B (good), and when the evaluation result was inferior to that of the ECO-SOLDER RMA02, the evaluation result is determined as C (poor). Note that the ECO-SOLDER RMA02 manufactured by Senju Metal Industry Co., Ltd satisfies JIS AA level (JIS Z 3197:2012).

Insulation Resistance

The evaluation is performed in accordance with JIS Z3197:2012 8.5.3. Specifically, a resin flux cored solder was soldered to a comb-line substrate and disposed under a high temperature and a high humidity environment at 85° C., 85% RH, and then an electrical resistance is measured by applying 100V voltage using an ion migration evaluation system AMI-150-U-5 manufactured by Espec corporation. According to JIS Z 3283:2017, it is defined that an insulation resistance is measured at a time when 168 hours elapses. However, according to the present disclosure, an evaluation criteria is set to be the lowest insulation resistance in 168 hours (lowest value) which is a stricter condition than that of the JIS standard. The JIS AA level defines a resistance larger than or equal to $1\times10^9\Omega$ to be pass (i.e. B) and defines a resistance lower than $1\times10^9\Omega$ to be fail (i.e. C).

TABLE 1

| | Material name | | Example 1 | Example 2 | Example 3 | Example 4 | Example 5 | Compartive Example 1 |
|---|---|---|---|---|---|---|---|---|
| Flux | Flux acids value (total acid value) (KOH mg/g) | | 26.1 | 52.8 | 2.6 | 26.9 | 32.1 | 103.7 |
| | Rosin | Hydrogenated rosin (acid value: 170) | — | — | — | — | — | 61 |
| | | Acrylic acid modifed rosin (acid value: 235) | 10 | 21.4 | — | 10 | 12.2 | — |
| | | Rosin ester (acid value: substantialy 0) | 86.4 | 75 | 93.8 | 82.1 | 79.9 | 30 |
| | Activator (wt %) | Organic acid | 0.3 | 0.3 | 0.3 | 0.3 | 0.3 | — |
| | | Halogen-based activator | 2 | 2 | 2 | 4 | 4 | 8.7 |
| | | Amine | 1.3 | 1.3 | 3.9 | 3.6 | 3.6 | 0.3 |
| | Content ratio of acid free rosin in Flux (wt %) | | 86.4 | 75 | 93.8 | 82.1 | 79.9 | 30 |
| | Heating loss at 400° C. (wt %) | | 50.8 | 46.7 | 39.1 | 49.5 | 51 | 75 |

TABLE 1-continued

| Material name | | Example 1 | Example 2 | Example 3 | Example 4 | Example 5 | Compartive Example 1 |
|---|---|---|---|---|---|---|---|
| Dirt evaluation | Result | B | B | B | B | B | C |
| Wettability evaluation | Result | A | A | B | A | A | B |
| Insulation resistance | Result | B | B | B | B | B | C |

According to the above Table 1, in the case where the flux has an acid free rosin (substantially acid value is 0) as the main component thereof (specifically, examples 1 to 5), it is understood that stain can be prevented from accumulating inside the cylindrical soldering iron main body 21. Further, the wettability shows a good result, and the insulation resistance is sufficiently high, showing better insulation reliability. In contrast, when the main component is not the acid free rosin, that is, rosin of which the acid value is substantially 0 (comparative example 1), stain is likely to be accumulated.

Figure 6:
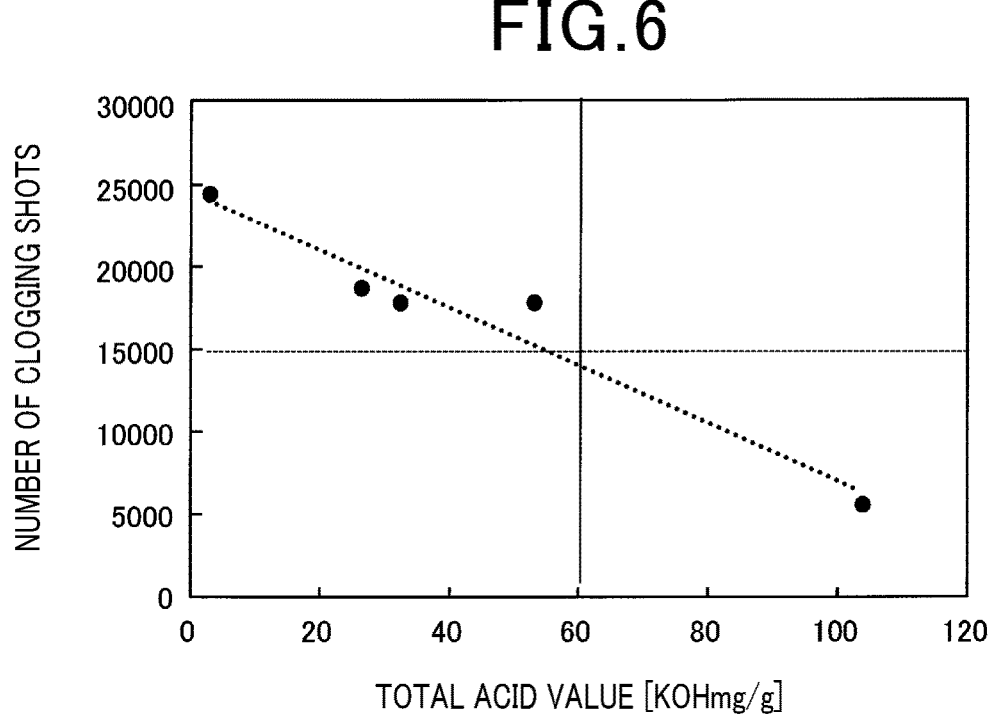
FIG. 6 is a graph showing a relationship between a total acid value and the number of clogging shots of examples 1 to 3, 5 and a comparative example 1 in the experiment example.
Figure 7:
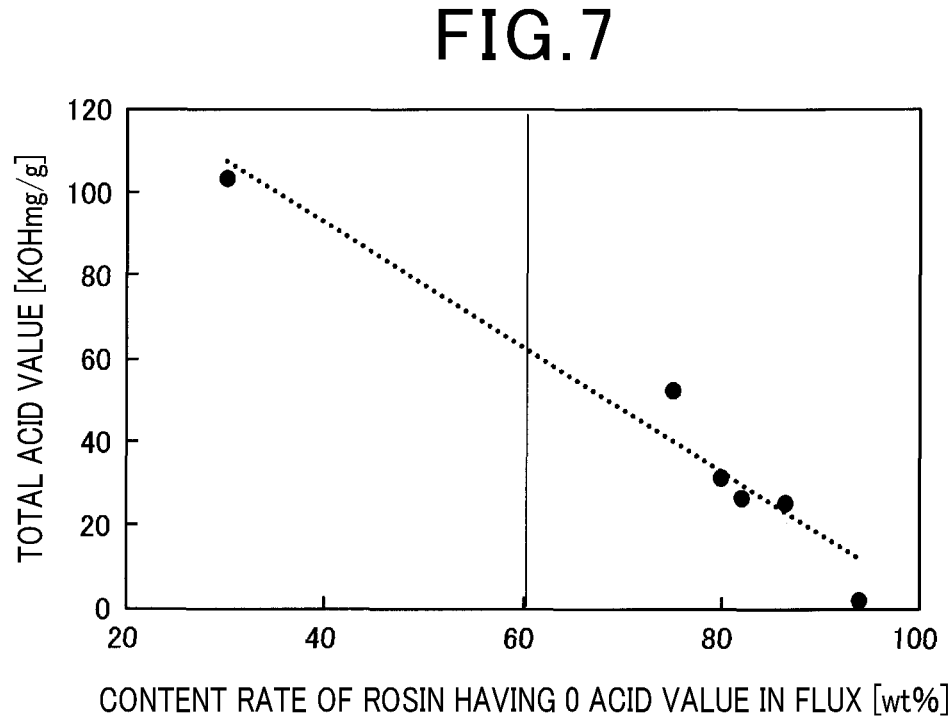
FIG. 7 is a graph showing a relationship between a content rate of acid free rosin in a flux and a total acid value of examples 1 to 3, 5 and a comparative example 1 in the experiment example.

According to FIG. 6, the total acid value of the flux and the number of clogging shots are correlated. When the total acid value is smaller than or equal to 60 mgKOH/g, the number of clogging shots is sufficiently high. Further, as described, setting the total acid value to be even smaller, the number of clogging shots can be larger than or equal to 15000. Moreover, according to FIG. 7, the total acid value has a correlation with the content rate of the acid free rosin in the flux.

Figure 8:
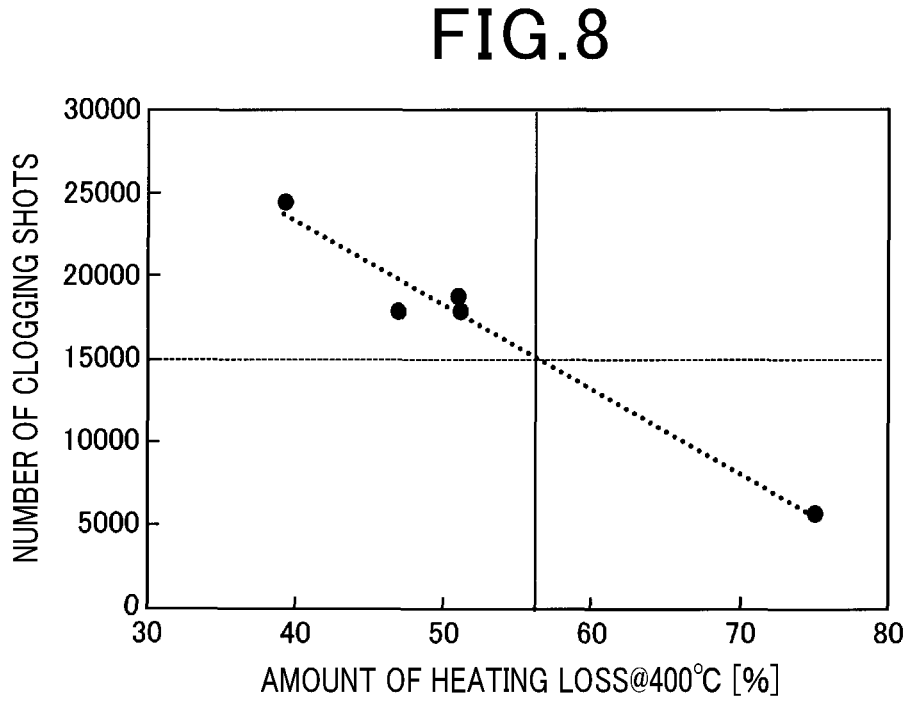
FIG. 8 is a graph showing a relationship between a result of thermogravimetry at 400° C. and the number of clogging shots of examples 1 to 3, 5 and a comparative example 1 in the experiment example.
Figure 9:
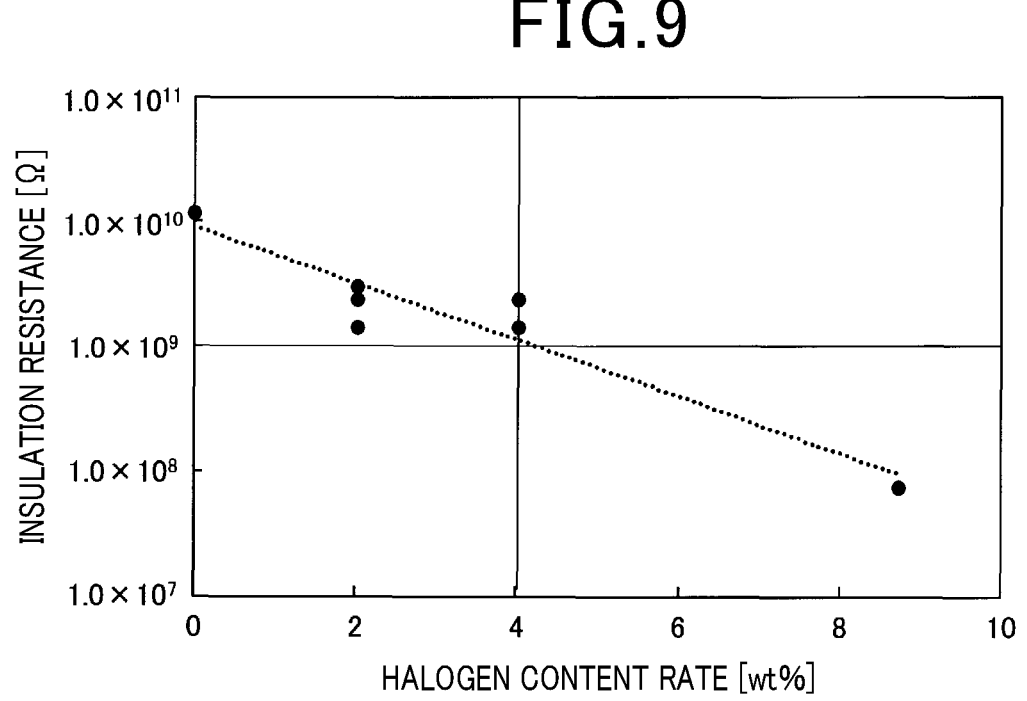
FIG. 9 is a graph showing a relationship between a content rate of halogen and a result of an insulation resistance test.

Further, according to FIG. 8, in the case where an amount of heating loss of the flux at 400° C. is smaller than or equal to 55 mass %, the number of clogging shots becomes higher. Further, according to FIG. 9, in the case where the halogen content rate in the flux is smaller than or equal to 4 mass %, the insulation resistance is sufficiently high. Hence, solder products having good insulation reliability can be manufactured. Note that, according to FIG. 9, another flux was also produced other than those in the examples 1 to 5 and the comparative example 1, and the insulation resistance was evaluation. The evaluation result was also described.

The present disclosure is not limited to the above-described respective embodiments. The present disclosure can be applied to various embodiments without departing from the sprit of the present disclosure.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

CONCLUSION

The present disclosure provides a manufacturing method of soldered product capable of suppressing an accumulation of stain inside the cylindrical soldering iron.

A first aspect of the present disclosure is a method for manufacturing a soldered product by a solder object portion. The method includes a solder supplying step that causes a cylindrical soldering iron having a through hole to contact with the solder object portion to supply a thread solder piece to the solder object portion from the through hole; a heating step that heats the thread solder piece with the cylindrical soldering iron and causes to melt the thread solder piece at the solder object portion; and a curing step that cures a melting object of the thread solder piece to solder the solder object portion. The thread solder piece is composed of a core containing a flux and a coating member containing a solder alloy that covers the core. The flux has a rosin having an acid value which is substantially 0 as a main component thereof.

According to the above-described aspect, a method for manufacturing soldered products in which a stain can be prevented from accumulating inside a cylindrical soldering iron while making a wettability between the solder and the object solder portion a favorable state.

What is claimed is:

1. A method for manufacturing a soldered product by soldering a solder object portion, comprising:

a solder supplying step that causes a cylindrical soldering iron having a through hole to contact with the solder object portion to supply a thread solder piece to the solder object portion from the through hole;

a heating step that heats the thread solder piece with the cylindrical soldering iron and causes to melt the thread solder piece at the solder object portion; and a curing step that cures a melting object of the thread solder piece to solder the solder object portion, wherein the thread solder piece is composed of a core containing a flux and a coating member containing a solder alloy that covers the core, the flux has a rosin having an acid value of less than 10 KOHmg/g as a component thereof, and an amount of heating loss of the flux at 400° C. is smaller than or equal to 55 mass %.

2. The method according to claim 1, wherein a content rate of the rosin in the flux having the acid value of less than 10 KOHmg/g is larger than or equal to 60 mass %.

3. The method according to claim 1, wherein the flux further contains a rosin having an acid value larger than or equal to 150 KOHmg/g.

4. The method according to claim 1, wherein a total acid value of the flux is in a range from 20 KOHmg/g to 60 KOHmg/g.

5. The method according to claim 1, wherein the flux further contains a halogen-based activator; and a content rate of a halogen in the flux is less than or equal to 4 mass %.

6. The method according to claim 1, wherein the soldered product is used for a vehicle.

* * * * *